United States Patent [19]

van der Ploeg et al.

[11] 4,437,787

[45] Mar. 20, 1984

[54] PLASTIC CHEESE MOLD

[75] Inventors: Dirk C. H. van der Ploeg, Oud-Beyerland; Hendrikus M. Tameris, Rotterdam, both of Netherlands

[73] Assignee: Albany International Plastic B.V., Netherlands

[21] Appl. No.: 429,450

[22] Filed: Sep. 30, 1982

[51] Int. Cl.³ .................. B29C 1/00; B29C 15/00; A01C 25/13
[52] U.S. Cl. ............................ 425/84; 99/458; 99/465; 249/134
[58] Field of Search ............ 425/84; 99/458, 465 X

[56] References Cited
U.S. PATENT DOCUMENTS

| | | | |
|---|---|---|---|
| 140,734 | 7/1873 | Sharpe | 249/163 |
| 166,667 | 8/1875 | Watkins | 249/170 |
| 297,995 | 5/1884 | Hewitt | 249/163 |
| 1,224,687 | 5/1917 | Taliaferro | 249/170 |
| 3,815,851 | 6/1974 | Girard | 249/173 |
| 3,838,955 | 10/1974 | Dubbeld | 99/458 |

*Primary Examiner*—Willard E. Hoag
*Attorney, Agent, or Firm*—Ostrolenk, Faber, Gerb & Soffen

[57] ABSTRACT

A plastic cheese mold comprising on its inner wall a non woven of thermoplastic fibers heatsealed to the walls of the mold, said cheese mold comprising two shell halves forming an elongate cheese mold of a substantial equal cross-section over the length of the mold.

The shell halves engage movable clamping sledges and the bottom of the shell halves may be provided with a pivot.

The mold also comprises an outer bottom recess for coupling a follower.

8 Claims, 8 Drawing Figures

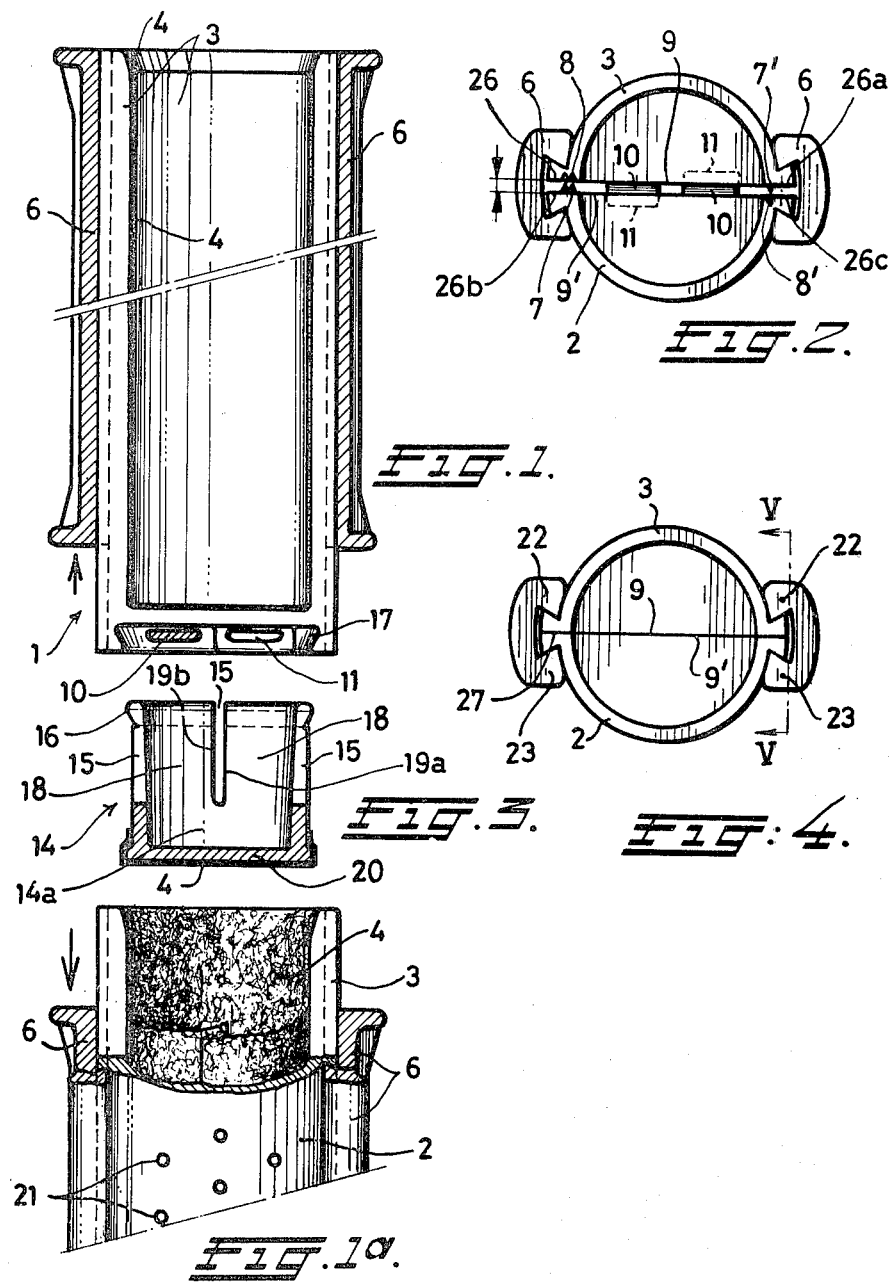

PLASTIC CHEESE MOLD

BACKGROUND OF THE INVENTION

1. Field of the Invention

The present invention relates to a plastic cheese mold with a bottom and provided with a permeable layer of material tightly connected with the cheese mold, the wall of the latter comprising liquid outlet openings.

2. Description of the Prior Art

Such a plastic cheese mold comprising a wall being provided with a liquid-permeable layer of material in the form of a non-woven consisting of thermoplastic fibers which are heatsealed to said wall, is known in the art. Said known plastic cheese mold is, however, only suitable for making spherical cheeses, more particularly Edam-cheeses.

Such spherical cheeses have the drawback that automatically operating metering machines can only difficultly subdivide them into portions of equal weight. Additionally there are important differences in the properties of the portions metered out.

There is therefore a great demand in the retail and in the wholesale trade, for cheeses having an oblong shape with an approximately equal cross section which lend themselves well to be subdivided into portions of equal weight and properties by means of automatically operating metering machines.

SUMMARY OF THE INVENTION

It is therefore a primary object of the present invention to provide a plastic cheese mold for making similar cheeses without affecting the quality of the cheese and without any expensive machines being required for that purpose.

This object is achieved according to the invention in that the cheese mold comprises at least two plastic shell parts each provided with a bottom end wall as well as with fixing means engaging with the shell parts, so that said shell parts form a mold having a substantially equal cross sectional surface along the length of the mold, said mold being provided with a substantially closed bottom.

The use of such a cheese mold implies that in a very simple manner, cheeses having a relatively great length can be made, said cheeses having a substantially equal cross-sectional surface along their length, so that the subdivision of them into portions of equal weight and practically equal properties can be performed in a very simple way.

In an advantageous embodiment the bottom part of the plastic cheese mold is provided with coupling members for coupling a follower. When a plastic cheese mold is coupled to a follower a great number of plastic cheese molds according to the invention can be placed behind each other, whereupon a horizontal pressure exerting member presses the curd in each plastic cheese mold in one single pressure action to the structure required for the desired quality of the cheese, so that a plurality of cheeses are made in one single operation.

The shell parts are advantageously half-cylindrical shell parts so that cylindrical cheeses are obtained which lend themselves extremely well to the subdivided into portions of an equal quality and weight.

To form a closed plastic cheese mold a longitudinal end edge of a shell part is advantageously provided with a groove, the opposite longitudinal end edge of said other shell part being provided with a rib so as to obtain a tightly closed dovetail connection.

The fixing means for fixing the shell parts together advantageously consists of clamping means engaging protruding rib-shaped portions of the shell parts.

So as to easily open the plastic cheese molds after the cheese has been made, the inner edges of the clamping means and the outer edges of the rib-shaped portions are so designed that the shell parts and the bottom end walls interact substantially sealingly in the closed position of the cheese mold, whereas a displacement of the fixing means toward the other side of the plastic cheese mold, causes the plastic shell parts to move at distance from each other. Advantageously recesses are formed in the free edges of one bottom end wall, whilst the other bottom end wall is provided with projections which can be accomodated in said recesses in the other bottom end wall of a shell part of the cheese mold.

The features of the present invention which are believed to be novel are set forth with particularity in the appended claims while many of the attendant advantages will be better understood by reference to the following detailed description and considered in connection with the accompanying drawings in which similar numerals designate similar parts throughout the figures.

DESCRIPTION OF THE DRAWINGS

FIG. 1 is a cross section of a plastic cheese mold according to the invention along the line extending over the front edge surfaces of a half cylindrical shell part;

FIG. 1A is a plastic cheese mold, part of one shell part being broken away;

FIG. 2 is a top view of a plastic cheese mold of FIG. 1;

FIG. 3 is a section of a follower, illustrated detached from the closed plastic cheese mold of FIG. 1 but which can be coupled with the ready mold;

FIG. 4 is a top view of a closed plastic cheese mold according to FIG. 1A;

DESCRIPTION OF THE PREFERRED EMBODIMENTS

Figure 5:
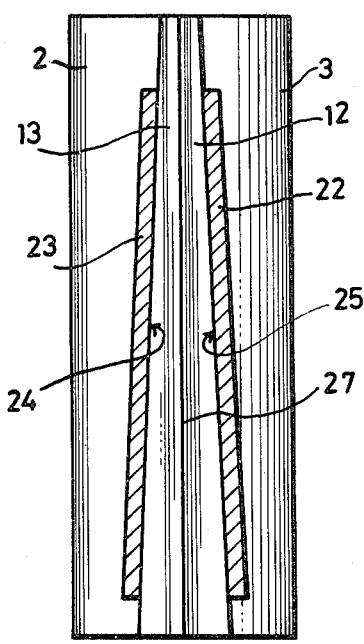
FIG. 5 is a section according to line V—V.

Referring now to FIGS. 1, 1A, and 2 two half cylindrical plastic shells 2, 3 are each provided with a bottom end wall 23a, 23b.

End edge 26 of shell 3 is provided with two longitudinal grooves 8 and end edge 26b of shell 2 is provided with two ribs 7 which ribs can be engaged in the longitudinal grooves 8, so providing a tight dovetail connection upon the engaging surface 27 of the two end edges 26, 26b, 26a, 26c, respectively (see FIG. 2). On the other side the end edge 26c is provided with groove 8' and end edge 26a is provided with groove 7'.

The free edge 9 of bottom end wall 23a is provided with protruding parts 10 which engage corresponding recesses 11 in the free end of bottom end wall 23b of the other half-cylindrical plastic shell (FIG. 2).

Shells 2 and 3 advantageously consist of polypropylene although other polyolefins and plastics may be used for this purpose.

The inner side of the half-cylindrical plastic shells is provided with a moisture-permeable layer 4 consisting of a polypropylene non-woven layer being heatsealed to the half-cylindrical shells 2 and 3, as the plastics for the production of the half-cylindrical shells has been injected around the surface of the non-woven 4.

When displacing clamping sledges 6, as illustrated later on, downwardly the two half-cylindrical plastic shells 2 and 3 are moved from each other so that the cheese mold is open as shown in FIG. 2. A similar view of a closed cheese mold is illustrated in FIG. 4. Said figure further illustrates that the two half-cylindrical plastic shells 3 form a closed plastic cheese mold, the inner side being covered with a practically continuous layer of a plastic non-woven 4.

To simultaneously press a great number of cheeses in one single operation, it is preferred to subject a great number of plastic cheese molds 1 according to the invention and located behind each other, to one single pressure operation by means of a horizontal pressure exerting machine.

Referring now to FIG. 4 it is preferred to use a follower 14 for each plastic cheese mold according to the invention which follower also consists of a plastic material also being covered at the bottom side with a moisture permeable non-woven layer 4, whilst drainage openings 21 in the shells are provided for the drainage of whey.

The top part of said follower 14 preferably comprises four conically extending incisions 15 with a bottom 20, said incisions being bounded by incision edges 19a and 19b.

Due to the presence of said incisions four equidistant lip-shaped parts 18 being provided resiliently with respect to the other remaining part 14a of the follower, are provided along the entire circumference of said follower.

Said lip-shaped parts 18 are at their free top sides provided with coupling edge parts 16 which may snappingly engage annular recesses 17 in the plastic cheese mold.

Reverting now to FIG. 2 after having pressed the cheese, said cheese can easily be removed from the plastic cheese mold according to the invention by displacing the clamping sledges 6 downwardly so that the two half-cylindrical shells 2 and 3 will move away from each other thereby forming an opening 24 in the bottom.

During moving the half-cylindrical plastic shells from each other the circumferential edge parts 16 of the follower are additionally detached with respect to the annular recesses 17, so that the follower can be removed from the cheese mold whereupon the cheese can be discharged.

Due to the resilient properties of the lip-shaped parts 18 it is obviously also possible to easily draw the follower from annular recesses or recess 17.

The action of the clamping sledges 6 is illustrated in FIG. 5. This figure shows the sledge parts 22 and 23 engaging the rib-surfaces 24 and 25 of the protruding ribs 12 and 13 of shell halves 3 and 2 said surfaces 24 and 25 diverging toward the bottom end walls 23a and 23b of the shell halves 2 and 3 respectively.

It will be obvious that a displacement of the clamping members 6 toward the upper open side of the shell halves will press these halves 2 and 3 against each other. On the other hand displacement in the direction of the bottom of the mold will allow the two parts to move from each other.

Figure 6:
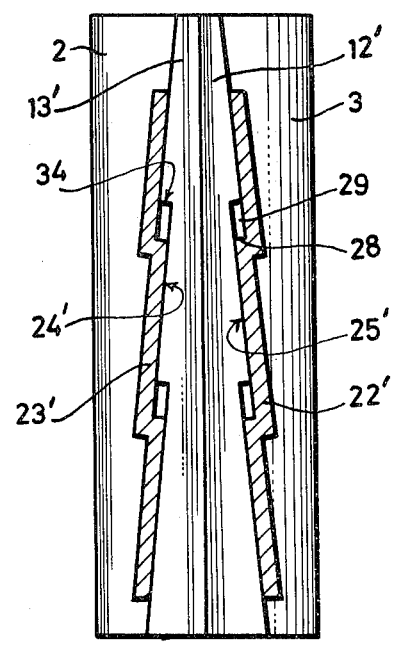
FIG. 6 is a similar section as in FIG. 5 of the embodiment of a plastic cheese mold.

As it is possible to push a clamping member 6 completely from the surfaces 24, 25 it is recommended to use the embodiment of FIG. 6. This embodiment comprises a plurality of surfaces 24' and 25' of protruding ribs 12' and 13' of the shell halves each diverging to the bottom and correspondingly executed sledge parts 22', 23'. The connecting surfaces 28 determine the upper movement of the clamping members 6 as these surfaces will engage the connecting surfaces 34 of the rib surfaces 24' and 25' of the protruding ribs 12' and 13'. In the closed position of the mold the connecting surfaces 34 and 28 are at distance from each other thus forming a space 29.

Figure 7:
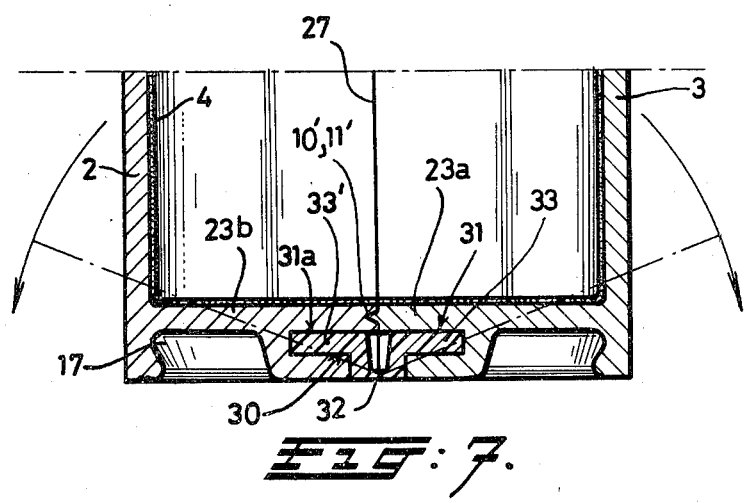
FIG. 7 is a longitudinal section through the lower part of a plastic cheese mold with a bottom pivot.

FIG. 7 shows an embodiment in which the shell halves 2, 3 are connected by a pivot 30 of e.g. polypropylene, said pivot 30 being accomodated in adapted spaces 31 and 31a.

The pivot 30 comprises a thin lower pivot connection 32 connecting the two pivot flanks 33, 33'.

If the cheese adheres to the shell halves after having removed the clamping sledges 6, the two shell halves are able to pivot around pivot connection 32 as shown by the arrows in FIG. 7.

Although the present invention has been shown and described in connection with a preferred embodiment thereof, it will be apparent to those skilled in the art that many variations and modifications may be made without departing from the invention in its broader aspects. It is therefore intended to have the appended claims cover all such variations and modifications as fall within the true spirit and scope of the invention.

What is claimed is:

1. A cheese mold of plastics material comprising: at least two matching shells each having an integral bottom member, said two shells and the bottom members when coupled together forming a hollow mold having a substantially constant integral cross-section along its length and with a bottom closure, said shells having a moisture permeably layer securely attached to their inner walls, said mold having at least one outlet opening for removing whey; said bottom members having a hinged connection therebetween and having adjacent thereto an annular recess and a hollow follower container member having edges frictionally engaged with said mold in said annular recess.

2. Plastic cheese mold as claimed in claim 1, wherein the plastic shell parts are half-cylindrical shells being provided with half-cylindrical bottom end walls.

3. Plastic cheese mold as claimed in claim 1, wherein an end edge of a plastic shell part is provided with a groove whereas the opposite end edge of an other shell part is provided with a rib in such a manner that a dovetail connection is formed at an interaction of a rib and a groove.

4. Plastic cheese mold as claimed in claim 1, wherein the fixing means are clamping sledges (6) engaging protruding rib-shaped portions of the shell parts.

5. Plastic cheese mold as claimed in claim 1, wherein the shell parts consist of a thermoplastic material.

6. A plastic cheese mold as claimed in claim 1, wherein the inner edges of clamping sledges (6) and the outer edges of the protruding ribs on shell parts are diverging to the bottom side of the mold so that on moving the clamping sledges toward the direction of the open end of the molds, the shell parts and the bottom end walls are sealingly interconnected while a displacement of the clamping sledges toward the bottom side of the mold moves the shell parts apart from each other.

7. Plastic cheese mold as claimed in claim 1, wherein the two shell parts are pivotably interconnected.

8. A plastic cheese mold as claimed in claim 4, wherein the pivoting connection of the pivot is situated below the bottom side of the closed mold.

* * * * *